United States Patent [19]  
Robinson

[11] 4,006,279  
[45] Feb. 1, 1977

[54] OXIDATION ENHANCING-VITREOUS ENAMEL COATING ON METAL SUBSTRATE AND COMPOSITION THEREFOR

[75] Inventor: Ian George Robinson, Noble Park, Australia

[73] Assignee: Blythe Colours (Australia) Proprietary Ltd., East Brighton, Australia

[22] Filed: June 13, 1975

[21] Appl. No.: 586,825

Related U.S. Application Data

[63] Continuation of Ser. No. 420,187, Nov. 29, 1973, abandoned.

[52] U.S. Cl. .................................. 428/432; 106/48
[51] Int. Cl.$^2$ .................... B32B 17/06; C03C 5/02
[58] Field of Search ......... 106/48 C; 252/471, 472, 252/476, 454, 461; 428/210, 209, 206, 432, 433

[56] References Cited

UNITED STATES PATENTS

| | | | |
|---|---|---|---|
| 3,509,041 | 4/1970 | Miale | 423/326 |
| 3,671,278 | 6/1972 | Borowski | 106/48 |
| 3,759,240 | 9/1973 | Borowski | 106/48 |
| 3,761,293 | 9/1973 | Carini et al. | 106/48 |
| 3,791,995 | 2/1974 | Chay | 106/48 |

*Primary Examiner*—Winston A. Douglas
*Assistant Examiner*—Mark Bell
*Attorney, Agent, or Firm*—Ladas, Parry, Von Gehr, Goldsmith & Deschamps

[57] ABSTRACT

A composition, adapted to be sintered on a substrate to form a vitreous enamel coating capable of enhancing oxidation of organic soils deposited thereon in the range of 300° to 550° F, comprises a comminuted mixture of previously smelted and quenched frit - producing material and a separate oxidation inducing agent in the form of a titanate bearing ore containing an oxide of a metal selected from the group consisting of nickel, cobalt, manganese, copper, chromium, iron and aluminum.

10 Claims, No Drawings

OXIDATION ENHANCING-VITREOUS ENAMEL COATING ON METAL SUBSTRATE AND COMPOSITION THEREFOR

This is a continuation of application Ser. No. 420,187 filed Nov. 29, 1973, now abandoned.

This invention relates to a vitreous coating composition of the type comprising a vitreous bonding flux or frit (hereinafter also referred to as "frit") and an oxidation inducing agent, said composition being capable, after the addition of suitable adjuncts and firing, of enhancing the oxidation of organic soils deposited thereon at temperatures in the range 300°–550° F, and to a method for producing said composition.

The above compositions find specific use, inter alia, as coatings on oven liners for the purpose of oxidizing organic soils commonly spattered thereon during oven use at normal oven operating temperatures.

The present invention provides a composition adapted to be sintered on a substrate to form a vitreous enamel coating capable of enhancing oxidation of organic soils deposited thereon in the range of 300° to 550° F, comprising a comminuted mixture of previously smelted and quenched frit - producing material and a separate oxidation inducing agent in the form of a titanate bearing ore containing an oxide of a metal selected from the group consisting of nickel, cobalt, manganese, copper, chromium, iron and aluminum.

The comminuted mixture has a grain size in the range 100–200 mesh (Tyler).

This invention further provides the combination of a vitreous enamel coating adhered to a substrate, said coating being capable of enhancing oxidation of organic soils deposited thereon in the range of 300° to 550° F comprising a sintered comminuted mixture of previously smelted and quenched frit-producing material and a separate oxidation inducing agent in the form of a titanate bearing ore containing an oxide of a metal selected from the group consisting of nickel, cobalt, manganese, copper, chromium, iron and aluminum.

The preferred titanate bearing ore according to this invention is Ilminite which consists essentially of iron titanate ($FeTiO_3$ or $FeOTiO_2$) whose components are:

| Iron | (FeO) | 36.8% |
| --- | --- | --- |
| Titanium | ($TiO_2$) | 31.6% |
| Oxygen | (O) | 31.6% |

The use of the titanate bearing ore has the advantage that it has, as can be seen from the above analysis, a certain amount of free oxygen which, upon heating at the prevailing temperatures during the use of the appliance utilizing the coating composition, releases oxygen to act as the oxidation inducing agent. Furthermore, the titanate bearing ore prevents the passing into solution of the oxide component thereof into the surrounding frit at the prevailing temperatures of appliance use.

Advantageously, the above compositions may include a silicate bearing ore containing an oxide of a metal selected from the group consisting of nickel, cobalt, manganese, copper, chromium, iron and aluminum. Preferably, the above silicate bearing ore is selected from the group consisting of Braunite ($3MnO_3 \cdot MnSiO_3$), Rhodonite ($MnSiO_3$ or $MnOSiO_2$), Tephroite ($Mn_2SiO_4$) and Alleghanyite ($5MnO \cdot 2SiO_2$). Other silicate bearing ores which can be used in accordance with the present invention are, for example, Spessartite [$(Mn_3Al_2 (SiO_4)_3$] and Sobralite [$(MnFeCaMg) SiO_3$].

The above silicate bearing ores act as auxiliary oxidating inducing agents in that they include the various oxides which are the active oxidation inducing agents and at the same time have the advantage that they also will prevent the solution of the oxides into the surrounding frit.

The compositions according to this invention may furthermore, in addition, contain elemental aluminium preferably in powdered form advantageously having a particle size of 200 mesh Tyler.

Generally, the proportions of total oxidation inducing agent to frit may vary between 95:5 to 60:40 parts by weight and the proportion of total oxidation inducing agent in the final coating composition (or enamel) is in the range 30 to 50% by weight.

The optional aluminium component acts as an agent to produce ductility in the sintered ceramic and forms a strong bond between the metal substrate and the vitreous enamel frit.

As is well known in the art, there is usually added to the mixture of frit and oxidation inducing agent, and comminuted therewith, one or more of the following materials: (a) binder, (b) colouring agent, (c) electrolyte, the resultant mixture being applied to the substrate as an aqueous suspension.

The binder used for bonding the vitreous composition to the substrate before firing may either be organic or inorganic or a mixture of these. Preferred binders are ball clay and bentonite.

Any colouring agent which is compatible with the vitreous composition and which will confer the desired colour on the resultant enamel can be used. Conveniently, the invention uses a black colouring agent.

Any electrolyte may be used in the composition and this may preferably be boric acid.

The vitreous bonding frit used in the invention may be constituted by a variety of materials in various proportions, such compositions being well known in the art. The frit is basically an alkali boro-silicate and is, as mentioned herein above, produced by the smelting and quenching of a batch of raw materials containing, inter alia, silica. The nature and proportions of these raw materials is again well known in the art.

In practice, the frit, oxidation inducing agent, and binder, are mixed in appropriate proportions and comminuted, for example by milling the materials, and the resultant composition is supplied to the appliance (e.g. oven) manufacturer with instructions to add appropriate quantities of water and optionally, organic binder, colouring agent and electrolyte. The resultant aqueous composition is then applied by spraying, dipping, or by other means, to the appropriate substrate (e.g. oven liner), followed by firing (sintering) of the composition at a temperature in the range 1400° to 1600° F.

While the above method is considerably more simple and economical than those presently known, the method also results in a vitreous coating composition having (when fired) greater abrasion resistance and at least the same oxidation enhancing properties as the composition produced in accordance with the methods of the prior art.

Also, by introducing the oxidation inducing agent into the frit, and not into the mixture of frit-producing raw materials prior to smelting, a greater flexibility is retained for altering the firing characteristics of the final composition. It is known that the firing temperature is directly dependent on the amount of oxidation inducing agent present in the final composition and thus by simply increasing or decreasing the proportion of oxidation inducing agent in the composition, by addition thereof to the frit, the firing temperature may be increased or decreased respectively. Thus the extreme ratios of oxidation inducing agent to frit quoted hereinabove are approximately equivalent to a firing range within the limits 1600° to 1400° F.

Furthermore, the use of a titanate bearing ore, optionally in conjunction with a silicate bearing ore, as hereinabove defined, ensures that the oxidation inducing agent does not pass into solution in the surrounding frit at the usual firing temperatures employed by applicance manufacturers (i.e. 1400° to 1600° F) with the consequent loss of oxidizing capacity. Thus, the use of the above ore as the oxidation inducing agent will ensure the retention of the oxidising properties of the enamel coating as well as an adequate abrasion resistance due to the fact that the firing temperature need not be lowered to prevent solution of the agent in the frit.

It will furthermore be appreciated that the use of the titanate bearing ores and, optionally, silicate bearing ores is more economical than that of the oxides heretofore used.

EXAMPLE

A mixture having the following composition:

| | |
|---|---|
| Ilminite ($FeTiO_3$ or $FeOTiO_2$) | 60 parts |
| Rhodonite ($MnSiO_3$ or $MnOSiO_2$) | 20 parts |
| Vitreous frit | 20 parts |
| Clay | 1 part |
| Bentonite | 3 parts | is dry ground to a particle size of approximately 80 mesh Tyler. To the above mixture (104 parts) boric acid (5 parts) black oxide (3 parts) and water (45 parts) are added and this is wet milled so as to reduce the particle size to approximately 4 grams residue for 50 cc. sample washed through a 200 mesh (Tyler) screen. Then 40 parts of aluminium powder having a particle size of 200 mesh (Tyler) is added to the milled batch and dispersed therein.

The resultant aqueous mixture is then sprayed on a suitably prepared substrate and the composition is then fired (sintered) at a temperature in the range 1400° to 1600° F.

I claim:

1. A composition adapted to be sintered on a metal substrate to form a vitreous enamel coating capable of enhancing oxidation of organic soils deposited thereon in the range of 300° to 550° F, comprising a comminuted mixture of previously smelted and quenched frit-producing material and a separate oxidation inducing agent in the form of a titanate bearing ore containing an oxide of a metal selected from the group consisting of nickel, cobalt, manganese, copper, chromium, iron and aluminum, in which the proportion of oxidation inducing agent to frit in the comminuted mixture is in the range of 95:5 to 60:40 parts by weight.

2. A composition according to claim 1, wherein said titanate bearing ore is Ilminite.

3. A composition as claimed in claim 1, wherein said composition includes a silicate bearing ore containing an oxide of a metal selected from the group consisting of nickel, cobalt, manganese, copper, chromium, iron and aluminum.

4. A composition as claimed in claim 3, wherein said silicate bearing ore is selected from the group consisting of Braunite ($3MnO_3 . MnSiO_3$), Rhodonite ($MnSiO_3$ or $MnOSiO_2$), Tephroite ($Mn_2SiO_4$), Alleghanyite ($5MnO . 2SiO_2$), Spessartite [$(Mn_3Al_2 (SiO_4)_3$] and Sobralite [$(MnFeCaMg) SiO_3$].

5. A composition as claimed in claim 1 including elemental aluminum.

6. The combination of a vitreous enamel coating adhered to a metal substrate, said coating being capable of enhancing oxidation of organic soils deposited thereon in the range of 300° to 550° F comprising a sintered comminuted mixture of previously smelted and quenched frit-producing material and a separate oxidation inducing agent in the form of a titanate bearing ore containing an oxide of a metal selected from the group consisting of nickel, cobalt, manganese, copper, chromium, iron and aluminum, in which the proportion of oxidation inducing agent to frit in the sintered comminuted mixture is in the range of 95:5 to 60:40 parts by weight.

7. The combination according to claim 6 wherein said titanate bearing ore is Ilminite.

8. The combination according to claim 6, wherein said mixture includes a silicate bearing ore containing an oxide of a metal selected from the group consisting of nickel, cobalt, manganese, copper, chromium, iron and aluminum.

9. The combination according to claim 8, wherein said silicate bearing ore is selected from the group consisting of Braunite ($3MnO_3 . MnSiO_3$), Rhodonite ($MnSiO_3$ or $MnOSiO_2$), Tephroite ($Mn_2SiO_4$), Alleghanyite ($5MnO . 2SiO_2$), Spessartite [$(Mn_3Al_2 (SiO_4)_3$] and Sobralite [$(MnFeCaMg) SiO_3$].

10. The combination according to claim 6, wherein said mixture includes elemental aluminum.

* * * * *